(12) United States Patent
Schmidt et al.

(10) Patent No.: US 9,395,539 B2
(45) Date of Patent: Jul. 19, 2016

(54) SYSTEM AND METHOD FOR OPTIMIZING HEAD-UP DISPLAY UNIFORMITY

(75) Inventors: John F. L. Schmidt, Phoenix, AZ (US); Brent D. Larson, Cave Creek, AZ (US); Victoria P. Haim, Glendale, AZ (US); Elias S. Haim, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1896 days.

(21) Appl. No.: 11/680,216

(22) Filed: Feb. 28, 2007

(65) Prior Publication Data
US 2008/0204360 A1 Aug. 28, 2008

(51) Int. Cl.
*G02B 27/01* (2006.01)
*G02B 27/00* (2006.01)

(52) U.S. Cl.
CPC ............ *G02B 27/01* (2013.01); *G02B 27/0025* (2013.01); *G02B 2027/014* (2013.01); *G02B 2027/0118* (2013.01)

(58) Field of Classification Search
CPC ....................................................... G02B 27/01
USPC ............................................................ 345/7
See application file for complete search history.

(56) References Cited

U.S. PATENT DOCUMENTS

| | | | |
|---|---|---|---|
| 5,748,264 A | 5/1998 | Hegg | |
| 6,222,508 B1 * | 4/2001 | Alvelda et al. | 345/8 |
| 6,229,515 B1 * | 5/2001 | Itoh et al. | 345/103 |
| 6,271,825 B1 * | 8/2001 | Greene et al. | 345/694 |
| 7,002,546 B1 * | 2/2006 | Stuppi et al. | 345/102 |
| 2001/0008394 A1 * | 7/2001 | Kanamori | 345/7 |
| 2001/0035853 A1 * | 11/2001 | Hoelen et al. | 345/102 |
| 2002/0135573 A1 * | 9/2002 | Kanamori | 345/204 |
| 2004/0066547 A1 * | 4/2004 | Parker et al. | 359/15 |
| 2005/0013005 A1 * | 1/2005 | Rogers | 359/630 |
| 2005/0018308 A1 * | 1/2005 | Cassarly et al. | 359/630 |
| 2006/0006821 A1 * | 1/2006 | Singer et al. | 315/312 |
| 2006/0221640 A1 * | 10/2006 | Kuo | 362/618 |

OTHER PUBLICATIONS

Israel Office Action for Patent Application No. 189808 dated Apr. 5, 2011.
Ministry of Justice, The Registrar of Patents, The Patent Office; IL Patent Application No. 189808, Notification No. 25 dated Jun. 17, 2012.

* cited by examiner

*Primary Examiner* — William Boddie
*Assistant Examiner* — Andrew Schnirel
(74) *Attorney, Agent, or Firm* — Ingrassia Fisher & Lorenz, P.C.

(57) ABSTRACT

A system and method for optimizing image uniformity in a head-up display (HUD) are provided. An imaging subsystem is characterized in that if light of a first uniformity is propagated therethrough, an uncompensated image would be displayed to a user via uncompensated image light. The uncompensated image light has first and second portions with respective first and second values of a radiant property. A difference between the first and second values is a first amount. The light source is configured to emit source light of a second, predetermined uniformity through the imaging system such that a compensated image is displayed to the user via compensated image light. The first portion of the compensated image light has a third value of the radiant property, and the second portion of the compensated image light has a fourth value of the radiant property. A difference between the third and fourth values is less than the first amount.

14 Claims, 9 Drawing Sheets

SYSTEM AND METHOD FOR OPTIMIZING HEAD-UP DISPLAY UNIFORMITY

TECHNICAL FIELD

The present invention generally relates to head-up display (HUD) systems, and more particularly relates to a system and method for optimizing image uniformity on a head-up display.

BACKGROUND

In recent years head-up displays (HUDs) have become an increasingly popular mechanism for displaying information to an operator of a vehicle, such as an aircraft. One of the primary reasons for the increasing demand for HUDs is that the information may be displayed to the operator while the operator looks through his or her windshield. That is, the operator does not need to look away from the windshield in order to view the desired information.

Typical HUD systems often include a display device, such as a cathode ray tube (CRT), an optics array (typically including several lenses), and an image combiner. Established performance expectations for HUDs have evolved based on these CRT systems. Certain more recent HUD systems have begun to include a liquid crystal display (LCD) panel and a backlight as the display device. In an LCD HUD system, light from the backlight passes through the LCD panel to create the desired image, and the optics array focuses the image to a desired apparent viewing distance and displays it on the image combiner, which is typically a transparent screen on which the image is displayed while the operator simultaneously views the outside world therethrough. The image is sometimes referred to as being focused on the combiner even though the apparent focus is design dependent and does not necessarily coincide with the location of the image combiner. Often, the HUD image is adjusted to be substantially collimated, for example with the apparent focus at a distant location. In such implementations, this focused image is incident on and reflected by the combiner.

Due to various imperfections in the design and manufacturing of the components of the HUD systems, the image displayed on the image combiner often exhibits variations in brightness and/or color across the viewable surface area of the image combiner. More particularly, various portions of the light propagating from the image combiner to the user have differing values of radiant properties, such as luminance and frequency. These variations increase the difficulty in optimizing system performance. For example, if particular portions of the image displayed on the image combiner are too bright, the operator may be distracted. However, if portions of the image are too dim, the operator will not be able to see them at all.

Accordingly, it is desirable to provide a system and method for optimizing image uniformity on a head-up display. Furthermore, other desirable features and characteristics of the present invention will become apparent from the subsequent detailed description and the appended claims, taken in conjunction with the accompanying drawings and the foregoing technical field and background.

BRIEF SUMMARY

A head-up display (HUD) system is provided. The HUD system includes an imaging subsystem and a light source. The imaging subsystem is characterized in that if light of a first uniformity were propagated therethrough, an uncompensated image would be displayed to a user via uncompensated image light propagating from the imaging subsystem to the user. The uncompensated image light has a first portion with a first value of a radiant property and a second portion with a second value of the radiant property. A difference between the first and second values of the radiant property is a first amount. The light source is configured to emit source light of a second, predetermined uniformity through the imaging system such that when the source light is propagated through the imaging subsystem, a compensated image is displayed to the user via compensated image light. The first portion of the compensated image light has a third value of the radiant property, and the second portion of the compensated image light has a fourth value of the radiant property. A difference between the third and fourth values of the radiant property is a second amount that is less than the first amount.

A head up display (HUD) system is provided. The HUD system includes a liquid crystal display (LCD) panel, at least one lens, an image combiner, and a light source. The LCD panel is configured to modulate light propagating therethrough. The at least one lens is arranged to focus the light propagating from the LCD panel. The image combiner is configured to simultaneously capture the light from the at least one lens and display a first image to a user and transmit light propagated from an object to display a second image to the user. The LCD panel, the at least one lens, and the image combiner jointly form an imaging subsystem characterized in that if light of a first uniformity were propagated therethrough, an uncompensated first image would be displayed to the user via uncompensated image light propagating from the image combiner to the user, the uncompensated image light having a first portion with a first value of a radiant property and a second portion with a second value of the radiant property, a difference between the first and second values being a first amount. The light source includes a plurality of light generating components configured to emit source light of a second, predetermined uniformity through the imaging system such that when the source light is propagated through the imaging subsystem, a compensated first image is displayed to the user via compensated image light, a first portion of the compensated image light having a third value of the radiant property and a second portion of the image light having a fourth value of the radiant property, a difference between the third and fourth values being a second amount, the second amount being less than the first amount, the first portion of the compensated image light corresponding to the first portion of the uncompensated image light and the second portion of the compensated image light corresponding to the second portion of the uncompensated image light.

A method for optimizing image uniformity in a HUD is provided. A HUD imaging subsystem comprising a viewing screen is provided. A difference between a first value of a radiant property of a first portion of image light propagated to a user from the viewing screen and a second value of a radiant property of a second portion of the image light propagated to the user from the viewing screen is determined. The image light is propagated to the user if light of a first uniformity is propagated into the imaging subsystem. A light source is provided that is configured to emit source light of a second, predetermined uniformity through the imaging system such that the first portion of the image light has a third value of the radiant property and the second portion of the image light has a fourth value of the radiant property, a difference between the third and fourth values of the radiant property being less than the difference between the first and second values.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-9 are merely illustrative and may not be drawn to scale.

FIG. 1 to FIG. 9 illustrate a head-up display (HUD) system and a method for optimizing image uniformity on a HUD system. The HUD system includes an imaging subsystem and a light source. The imaging subsystem is configured such that when light of a first uniformity (e.g., substantially uniform) is propagated therethrough, an uncompensated, or non-uniform, image is displayed to a user via image light propagating from the imaging subsystem to the user. The image light has a first portion with a first value of a radiant property and a second portion with a second value of the radiant property. The difference between the first and second values of the radiant property (i.e., the non-uniformity) may be caused by manufacturing and/or design tolerances in the imaging subsystem.

The light source is configured to emit source light of a second, predetermined uniformity (i.e., pre-selected non-uniformity) through the imaging system such that when the source light is propagated through the imaging subsystem, a compensated image is displayed to the user via the image light. The first portion of the image light then has a third value of the radiant property, and the second portion of the image light has a fourth value of the radiant property. The difference between the third and fourth values of the radiant property is less than the difference between the first and second values of the radiant property. That is, the uniformity of the image displayed to the user is improved.

Figure 1:
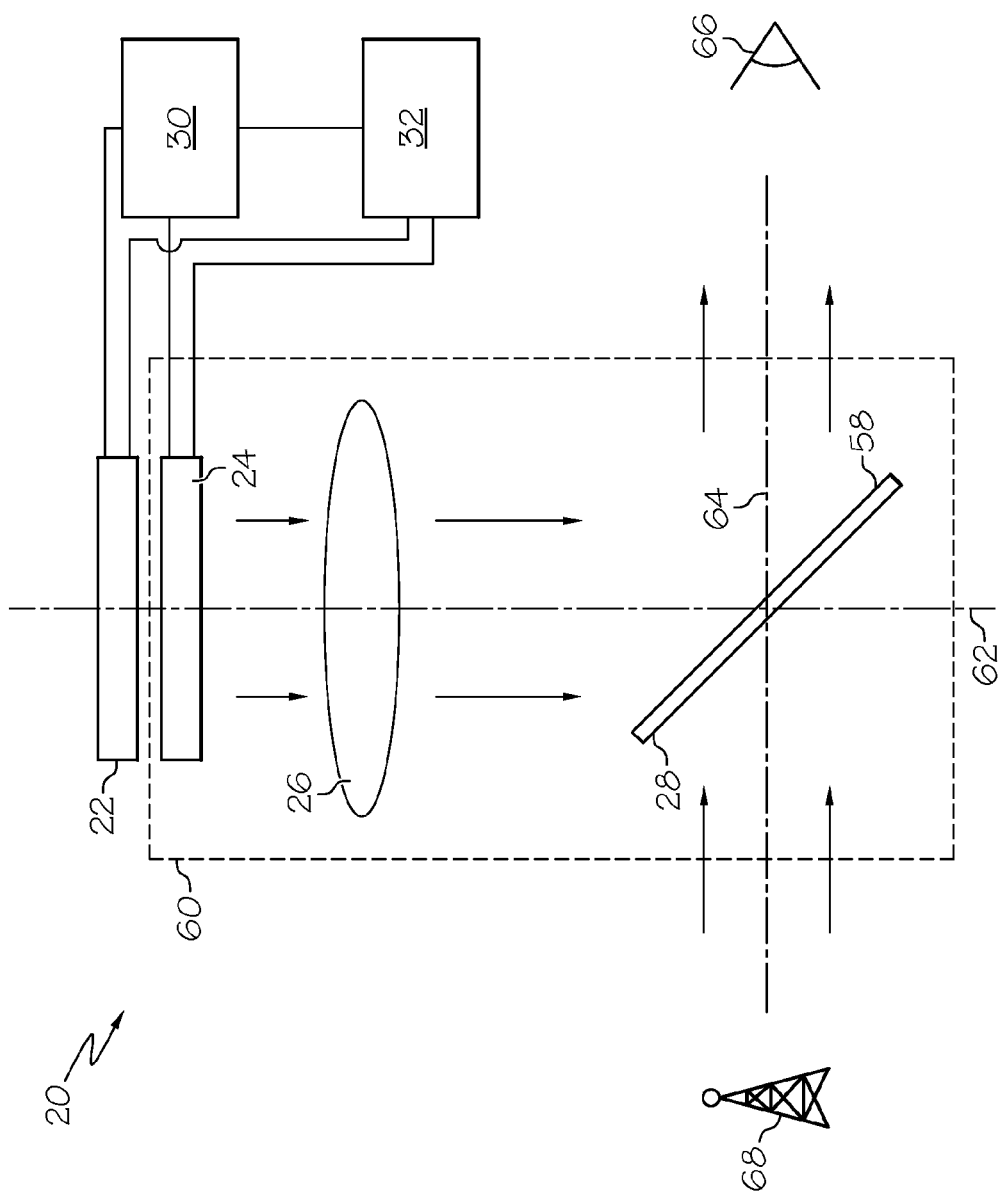
FIG. 1 is a schematic side view of a head up display (HUD) system, according to one embodiment of the present invention.

FIG. 1 illustrates a head-up display HUD system 20, according to one embodiment of the present invention. The HUD system 20 includes a backlight 22, a liquid crystal display (LCD) panel 24, an optics assembly 26, an image combiner 28, a power supply 30, and a controller 32. As is described in greater detail below, according to one aspect of the present invention, the backlight 22 is configured to emit light of a predetermined non-uniformity through the LCD panel 24 and the optics assembly 26 to display an image on the image combiner 28. The predetermined non-uniformity is selected to compensate for a characteristic, inherent non-uniformity in the performance of the LCD panel 24, the optics assembly 26, and/or image combiner 28.

Figure 2:
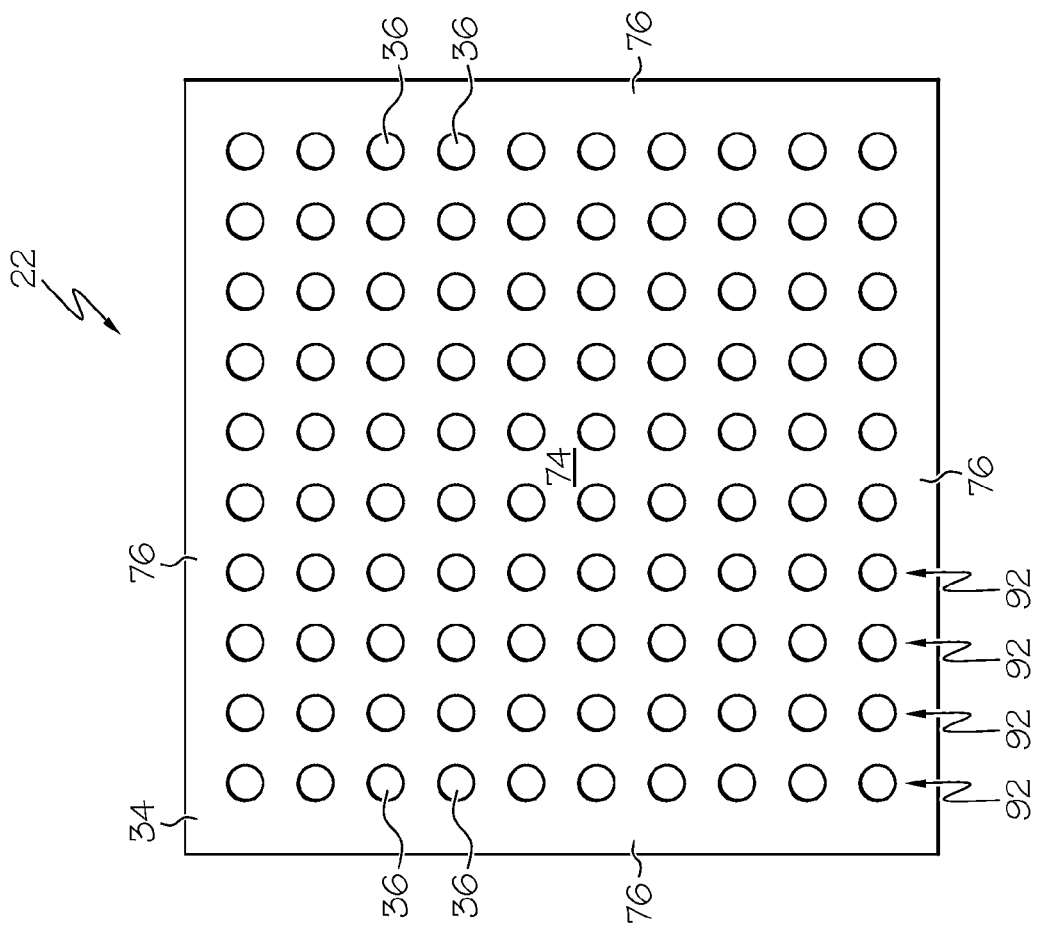
FIG. 2 is a plan view of a backlight within the HUD system of FIG. 1.

FIG. 2 illustrates the backlight 22, or light source, in greater detail. In one embodiment, the backlight is a light emitting diode (LED) panel which includes a support substrate 34 with an array of LEDs 36 mounted thereto. Although the LEDs 36 shown in FIG. 2 are arranged in a 10×10 array, for a total of 100 LEDs, it should be understood that the backlight 22 may include fewer or considerably more LEDs, such as over 1000. In one embodiment, all of the LEDs emit light within a particular frequency bandwidth range, or color, such as green (i.e., light with a wavelength between 500 nanometers (nm) and 565 nm and a frequency between 530 terahertz (THz) and 600 THz). As will be described in greater detail below, the LEDs 36 may be arranged such that particular LEDs 36 with unique optical, or radiant, performance characteristics (e.g., brightness, frequency, emission angle, etc.) may be placed within the array such that the backlight 22 as a whole emits light of particular "non-uniformity."

Figure 3:
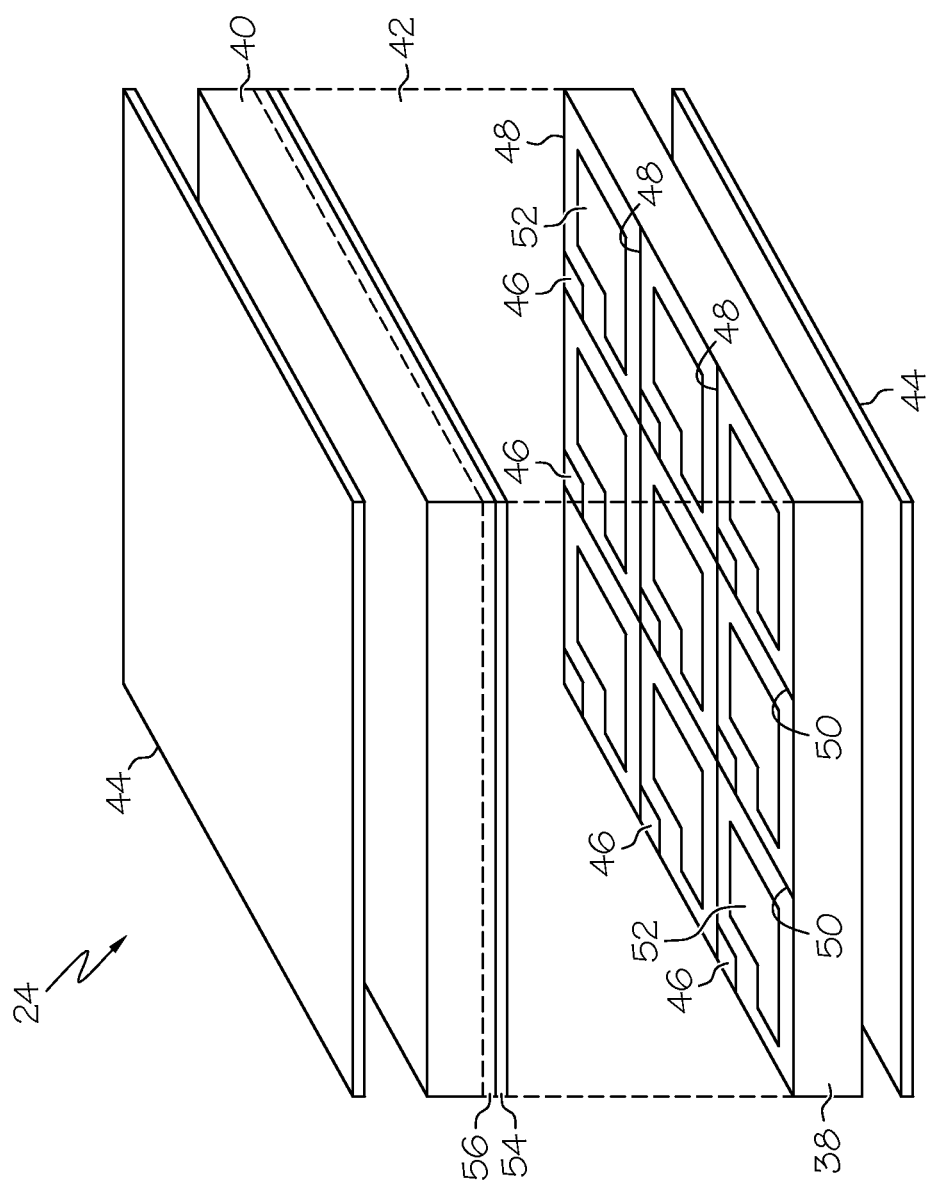
FIG. 3 is a cross-section isometric view of a portion of an liquid crystal display (LCD) panel within the HUD system of FIG. 1.

FIG. 3 illustrates a portion of the LCD panel 24 in greater detail. The LCD panel 24 is, in one embodiment, a thin film transistor (TFT) LCD panel and includes a lower substrate 38, an upper substrate 40, a liquid crystal layer 42, and polarizers 44. As will be appreciated by one skilled in the art, the lower substrate 38 may be made of glass and have a plurality of TFT transistors 46 formed thereon, including a plurality of gate electrodes 48 (i.e., row lines), including a plurality of rows of electrodes, and source electrodes 50 (i.e., column lines), including a plurality of columns of electrodes, interconnecting respective rows and columns of the transistors 46. The gate and source electrodes 48 and 50 divide the lower substrate 38 into a plurality of pixels 52, as is commonly understood. The upper substrate 40 may also be made of glass and include a common electrode 54 at a lower portion thereof and a color filter layer 56 at an upper portion thereof. The common electrode 54 may substantially extend across the upper substrate 40. The liquid crystal layer 42 may be positioned between the lower substrate 38 and the upper substrate 40 and include a liquid crystal material suitable for use in a LCD display. As shown, the LCD panel 24 includes two polarizers 44, with one being positioned below the lower substrate 38 and one above the upper substrate 40. Although not illustrated, the polarizers 44 may be oriented such that respective polarization angles thereof are substantially perpendicular.

Figure 4:
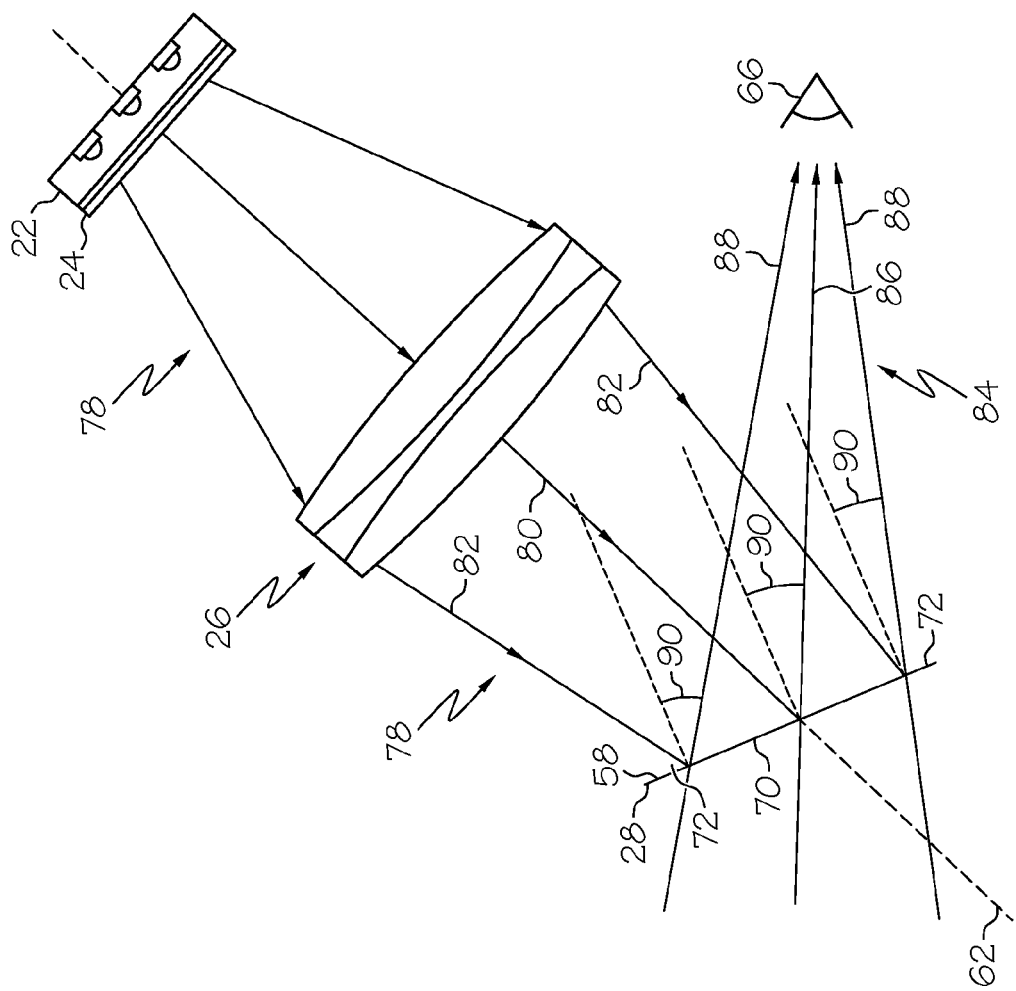
FIG. 4 is a side view of various components of the HUD system of FIG. 1 illustrating the operation thereof.

Referring to FIG. 4 in combination with FIG. 1, in one embodiment, the optics assembly 26 is an arrangement of lenses positioned between the LCD panel 24 and the image combiner 28 and, as will be described in greater detail below, configured to focus light emitted from the backlight 22 and through the LCD panel 24 onto the image combiner 28. However, as will be appreciated by one skilled in the art, the image generated by the light may not necessarily be in focus at the image combiner location, but rather at an apparent distance location. Although not illustrated in detail, the image combiner 28 is typically a semitransparent plate or viewing screen onto which light from the backlight 22 is focused after passing through the LCD panel 24 and the optics assembly 26. In the depicted embodiment, the image combiner 28 is substantially planar. However, as will be appreciated by one skilled in the art, the image combiner 28 may also be curved about one or more axes of curvature. Also, the image combiner 28 may also include an optical film on a surface 58 thereof that is configured to reflect light within a particular frequency band (i.e., color).

Still referring to FIGS. 1 and 4, the LCD panel 24, the optics assembly 26, and the image combiner 28 may jointly form an imaging subsystem 60 with an axis 62 (e.g., central axis) that extends through central portions of the LCD panel 24, the optics assembly 26, and the image combiner 28, as well as the backlight 22. As shown, the image combiner 28 is oriented such that the surface 58 thereof is at an angle to the central axis 62 of the imaging subsystem 60. As shown schematically in FIG. 1, the central axis 62 of the imaging subsystem 60 intersects a line of sight 64 between a user 66 (represented by an eye) of the system 20 and an outside object 68. In one embodiment, the user 66 is an operator, or pilot, of an aircraft in which the system 20 may be installed, and the object 68 is a landmark or other physical object visible through the windshield of the aircraft.

As shown in FIG. 1, the power supply 30 and the controller 32 are in operable communication and/or electrically connected to one another, as well as the backlight 22 and the LCD panel 24. The controller 32 (or processing subsystem), in one embodiment, as will be appreciated by one skilled in the art, may include electronic components, including various circuitry and/or integrated circuits (e.g., a microprocessor and a power supply), such as an Application Specific Integrated Circuit (ASIC) and/or instructions stored on a computer readable medium to be carried out by the microprocessor to perform the methods and processes described below.

Referring again to FIGS. 1 and 4, due to various manufacturing and design imperfections, the imaging subsystem 60 (and/or one or more of the LCD panel 24, the optics assembly 26, and the image combiner 28), or the performance thereof, may be characterized in that if substantially "uniform" light, or light of a first uniformity, is emitted through the LCD panel 24 and the optics assembly 26 and onto the image combiner 28, a "non-uniform" image would be displayed to the user 66. For the purposes of this description, the substantially uniform light may be characterized as such because values of various radiant properties (e.g., brightness, frequency, and propagation/emission angle), at the central and outer portions of the LCD panel 24 may be substantially similar as it enters the LCD panel 24. That is, all of the uniform light, whether entering the LCD panel 24 at the central portion near the axis 62 or the outer portions thereof, has substantially the same values of brightness, frequency, and/or propagation angle.

Figure 5:
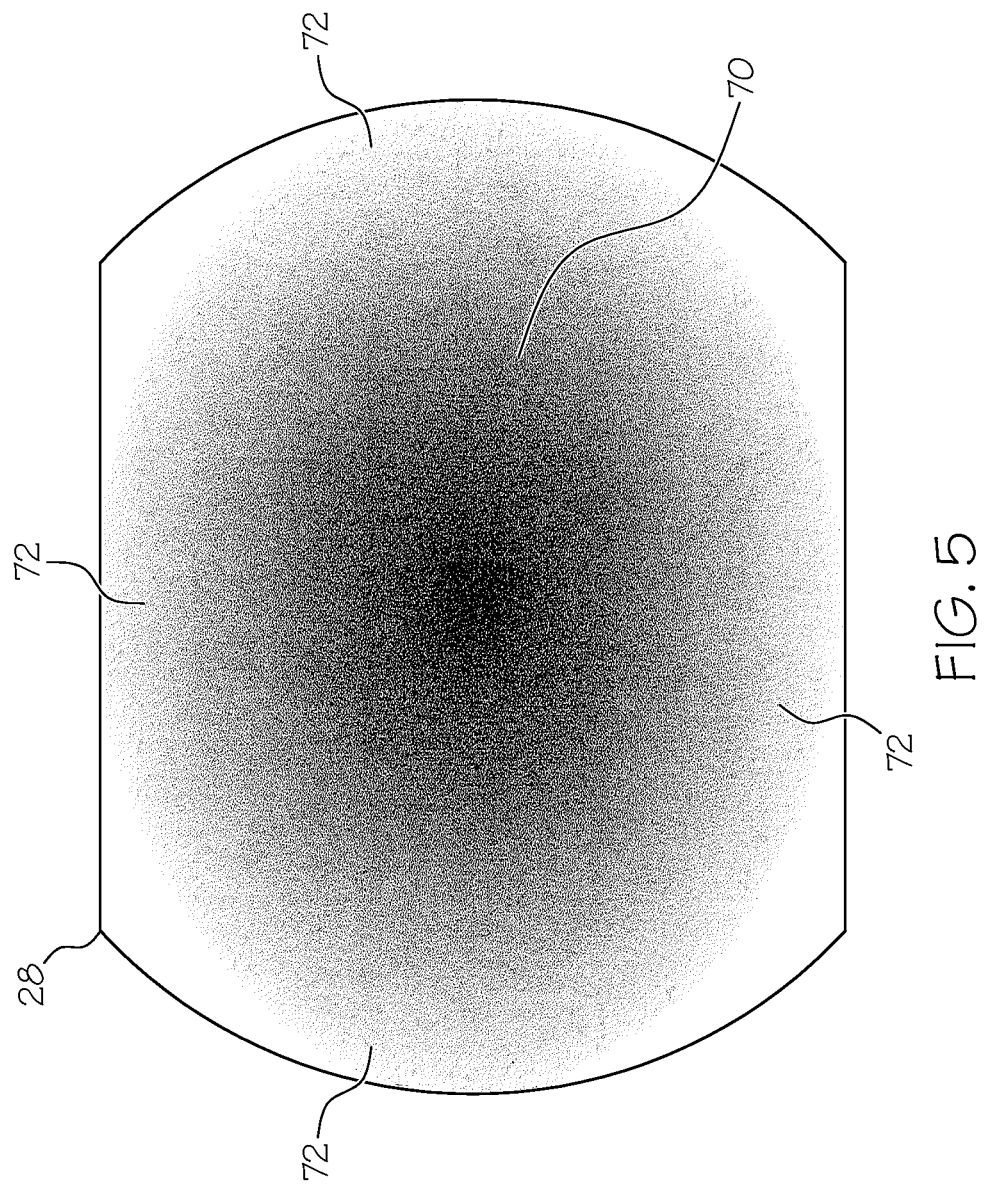
FIG. 5 is a plan view of an image combiner within the HUD system of FIG. 1 illustrating an uncompensated image displayed to the user.

After the uniform light passes through the LCD panel 24 and is focused by the optics assembly 26 prior to reflection by the surface 58 of the image combiner 28, an "uncompensated" or non-uniform image would be displayed on the surface 58 of the image combiner 28 via image light (i.e., uncompensated image light) that propagates from the image combiner 28 to the user 66. FIG. 5 illustrates an example of a non-uniform image displayed on the image combiner 28 if substantially uniform light is propagated through the imaging subsystem 60. The increasing density of dots (i.e., darker regions) represents an increase in the value of a radiant property (i.e., a first radiant property), such as brightness and/or frequency, of the image light propagated from the particular portions of the image combiner 28 to the user 66 and/or the eye of the user 66. In the example shown, the radiant property of image light increases towards a central portion 70 of the image combiner 28 and/or decreases away from outer portions 72 of the image combiner 28. Thus, the user 66 would observe a non-uniform image on the image combiner 28, as the image observed at the central portion 70 of the image combiner 28 would be, for example, brighter and/or of a different color, than the image observed at the outer portions 72 of the image combiner 28. In other words, a first portion of the image light has a first value of the first radiant property, and a second portion of the image light has a second value of the first radiant property.

As will be appreciated by one skilled in the art, the precise "non-uniformity" of the performance on the particular imaging subsystem 60 used may be calculated or determined using optical measurements and/or optical calculations based on the design of the imaging subsystem 60. As previously mentioned and described in greater detail below, in accordance with one aspect of the present invention, in order to reduce the non-uniformity in the image displayed to the user 66, the backlight 22 is configured to emit light of a preselected non-uniformity, or second uniformity, to mitigate and counteract the non-uniformity of the performance of the imaging subsystem 60 and/or the various components thereof.

In order to compensate for non-uniformity similar to that shown in FIG. 5, assuming the non-uniformity illustrated represents varying degrees of brightness, the backlight 22 is purposefully configured with LEDs 36 of varying brightness. As such, the LEDs 36 are arranged in accordance with respective values of a second radiant property (e.g., luminance, frequency, emission angle, etc.) on the substrate 34. For example, to counteract the non-uniformity shown in FIG. 5, in which brightness is the particular radiant property, the LEDs 36 are arranged such that the LEDs 36 at a central portion 74 on the support substrate 34 of the backlight 22 emit light of a lower luminance, or brightness, than the LEDs 36 located at outer portions 76 on the support substrate 34. As will be appreciated by one skilled in the art, the varying degrees of luminance of the LEDs may be achieved by providing varying degrees of power to the LEDs or testing and pre-sorting the LEDs based on luminance at a selected, testing power.

During operation of this embodiment, referring to FIGS. 2 and 4, the backlight 22 thus emits light (i.e., "source" light 78) of the preselected non-uniformity (e.g., decreased luminance near the central axis 62) through the LCD panel 24. As is commonly understood, the LCD panel 24 modulates the source light 78, to create an image, as it propagates therethrough towards the optics assembly 26. Referring specifically to FIG. 4, the source light 78 is focused by the optics assembly 26 onto the image combiner 28, with a central portion 80 of the source light 78 impinging the central portion 70 of the image combiner and outer portions 82 of the source light 78 impinging the outer portions 72 of the image combiner 28. As shown, the source light 78 is reflected by the image combiner 28 such that image light 84 (i.e., compensated image light) propagates from the image combiner 28 towards the user 66. In particular, a central portion 86 of the image light 84 (corresponding to the central portion 80 of the source light 78) propagates from the central portion 70 of the image combiner 28, and outer portions 88 of the image light 84 (each corresponding to a respective outer portion 82 of the source light 78) propagate from the outer portions 72 of the image combiner 28. As is apparent from FIGS. 4 and 5, the central portion 86 of the compensated image light 84 may also correspond to the portion of the uncompensated image light that would be propagated from the central portion 70 of the image combiner 28, and the outer portions 88 of the compensated image light 84 may also correspond to the portions of the uncompensated image light that would propagate from the outer portions 72 of the image combiner 28.

It should be noted that an angle of incidence 90, as measured from a normal to the surface 58 of the image combiner 28, between each portion of the source light 78 and the respective portion of the image light 84 may vary across the surface 58 of the image combiner 28. That is, in the depicted embodiment that utilizes a flat or planar image combiner 28, each of the portions 86 and 88 of the image light 84 may propagate from the image combiner 28 and towards the user 66 at a different angle (i.e., angle of incidence 90). It should be understood that this remains true regardless of the position of the user 66 (or the eye of the user 66), as during operation the exact position of the user's eye 66 may change. It should also be noted that in an embodiment that utilizes a curved image combiner, the angles that define the different portions of light may be measured from the line of sight, rather than from a normal to the surface 58 of the combiner (i.e., a normal).

Figure 6:
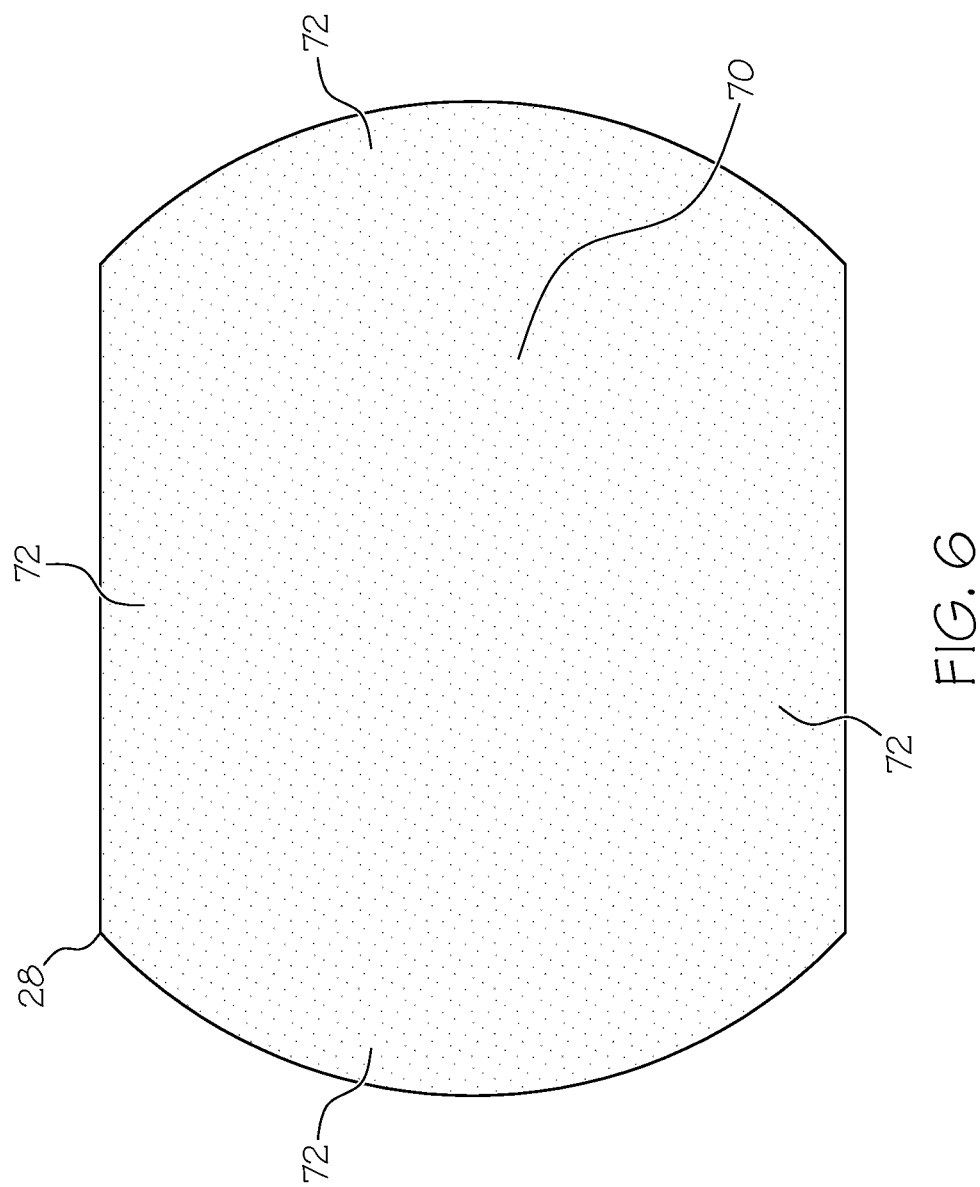
FIG. 6 is a plan view of the image combiner of FIG. 5 illustrating a compensated image displayed to the user.

Because of the intended non-uniformity in the source light 78, the portions 86 and 88 of the image light 84 have an improved uniformity with respect to the particular radiant property (e.g., brightness) discussed above. In other words, a difference between the value of the particular radiant property of the central portions 86 (i.e., a third value of the radiant property) and the value of the radiant property of the outer portions 88 (i.e., a fourth value of the radiant property) of the image light 84 has been reduced (i.e., to a second value). FIG. 6 illustrates an example of a "compensated" image displayed to the user 66 using the intended non-uniform source light 78 described above. As shown, the variation in, for example, brightness of the image between the central 70 and outer portions 72 as viewed by the user 66 on the image combiner 28 has been reduced when compared with that shown in FIG. 5.

Still referring to FIG. 5, the non-uniformity in the image shown may also correspond to values of radiant properties besides brightness, such as frequency (i.e., color). For example, the image light from the central portion 70 of the image combiner 28 may be of a first shade of a particular color, such as green while the light from the outer portions 72 of the image combiner 28 may appear to be, for example, a yellowish green shade. To compensate for the variation in the color of the image light, the LEDs 36 shown in FIG. 2 may be arranged such that particular LEDs 36 that emit a bluish green shade (i.e., shorter wavelengths) of light may be placed on the outer portions 76 of the backlight 22 while particular LEDs 36 that emit a yellowish green shade (i.e., longer wavelengths) of light may be placed at the central portion 74 of the backlight 22. As a result, in a manner similar to that of the brightness, the various portions 86 and 88 of the image light 84 will have an improved uniformity with respect to color. As will be appreciated by one skilled in the art, in order to determine the particular frequency, or color, of the LEDs 36, each LED 36 may be tested and sorted before the backlight 22 is constructed.

Referring again to FIG. 1, the controller 32 causes the LCD panel 24 to modulate the light passing through the imaging subsystem 60 in such a way that information (e.g., in the form of text, symbols, and figures) is displayed to the user 66 while the user 66 is looking through the image combiner 28 at the object 68 (i.e., along the line of sight 64). As such, the user 66 is able to view important information while maintaining his or her visual presence with the state of the vehicle.

One advantage of the system and method described above is that because of the non-uniformity intentionally created in the source light, the image displayed to the user will have an improved uniformity with respect to the respective radiant property, or properties, that the source light was designed. As a result, the user is provided with a clearer image of the various types of information displayed by the HUD system on the image combiner. More particularly, the performance of the HUD system may be may be more fully optimized as a more uniform image is provided to the user. In addition to improving the uniformity of radiant properties for different portions of the image light which represent different locations in the HUD image, the same embodiments can also be applied for different portions of the image light which travel to different eye locations of user 66, thereby improving uniformity over the eye motion box of the HUD.

Figure 7:
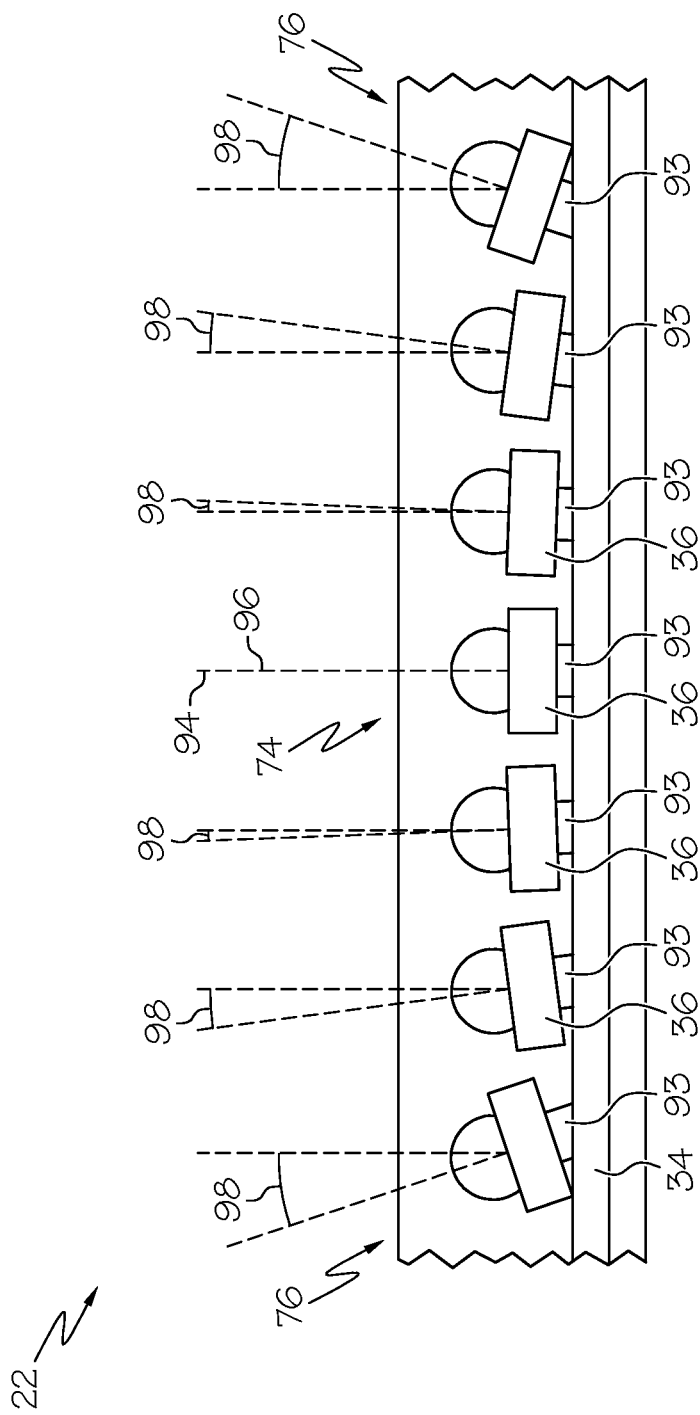
FIG. 7 is a cross-section side view of a backlight according to another embodiment of the present invention.

FIG. 7 illustrates the backlight 22, according to another embodiment of the present invention. As shown, the LEDs 36 are connected to the support substrate 34 via LED mounts 93 (or propagation angle mechanisms). Although not shown in detail, the mounts 93 may include hinges or ball-and-socket joints (i.e. to allow the LEDs 36 to be tilted about multiple axes). In the example shown, the mounts 93 near the central portion 74 of the support substrate 34 are arranged such that central axes 94 (i.e., emission/propagation directions) of the respective LEDs 36 are substantially congruent (i.e., parallel and overlapping) with lines 96 that are normal to the support substrate 34 (or a plane in which the LEDs 36 are arranged). As the distance of the LEDs 36 from the central portion 74 increases, an emission angle 98, as measured between the central axis 94 of each LED 36 and a respective one of the lines 96, increases as the mounts 93 are appropriately adjusted. This change in the emission angle 98 may be understood to be another example of the change in values of the second radiant property to produce an intended, predetermined non-uniformity in the light emitted by the backlight 22. The variations in the emission angle 98 may also be accomplished with optical components such as additional reflectors and lenses.

Figure 8:
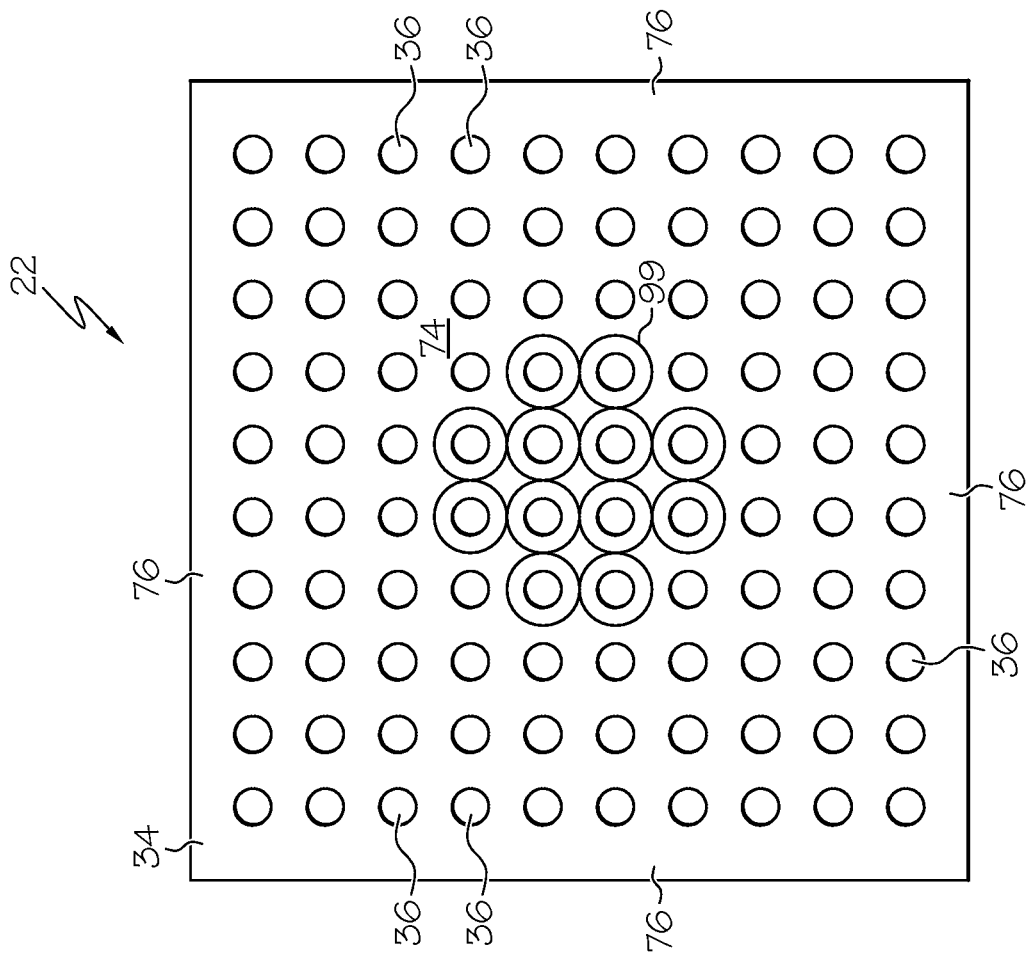
FIG. 8 is a plan view of the backlight according to a further embodiment of the present invention.

FIG. 8 illustrates the backlight 22, according to a further embodiment of the present invention. Although not shown in detail, the support substrate 34 may be covered with a reflective coating (or one or more reflective bodies) such that any light emitted from the LEDs 36 that reaches the support substrate 34 is reflected therefrom through the LCD panel 24 (FIG. 4). However, the support substrate 34 may also include non-reflective portions 99. The non-reflective portions 99 may take the form of portions of the support substrate 34 that are not covered with the reflective coating or non-reflective bodies (or bodies that are less reflective than the reflective coating). In the example shown, each of the non-reflective portions 99 is circular and concentric with a respective one of the LEDs 36 at the central portion 74 of the support substrate 34. As a result, the backlight 22 shown in FIG. 8 emits light with a predetermined non-uniformity that is defined by the light propagating from the central portion 74 of the support substrate being less bright than that propagating from the outer portions 76.

Referring again to FIG. 4, in a yet further embodiment, the surface 58 of the image combiner 28 may include a coating thereon (e.g., multilayer and holographic coatings) that exhibits spectral variation dependent on the angle of incidence 90. Varying the frequency or wavelength of the image light 78 according to the reflectance peak of the coating at each angle of incidence 90 will allow comparable reflectance at each at each of the angles of incidence 90 at the various portions of the image combiner 28. In a manner similar to that described above, the variation may be introduced, for example, by appropriate positioning of LEDs 36 according to the spectral performance thereof.

Other embodiments may utilize different methods and/or components to generate the intended non-uniformity in the source light. For example, in an embodiment in which the non-uniformity is related to luminance, the LEDs 36 (FIG. 2) may be arranged on the substrate 34 such that the spacing between is irregular. That is, in the regions of the substrate 34 where increased luminance is desired, the spaces between the LEDs may be smaller than in the regions where decreased luminance is desired. Different configurations of optical components may also be utilized. For example, the backlight may utilize multiple colors of LEDs. Referring once again to FIG. 2, as shown, the LEDs 36 are arranged in rows 92. In a multi-color embodiment, each row 92 of LEDs 36 may include LEDs 36 of only a particular color. As is commonly understood, the rows may be arranged in a sequence such as "red, green, blue, red, green, blue." In such an embodiment, the non-uniformity of the source light 78 (FIG. 4) may be configured by adjusting both the luminance and frequency of each of the LEDs 36 in a fashion similar to that described above.

Figure 9:
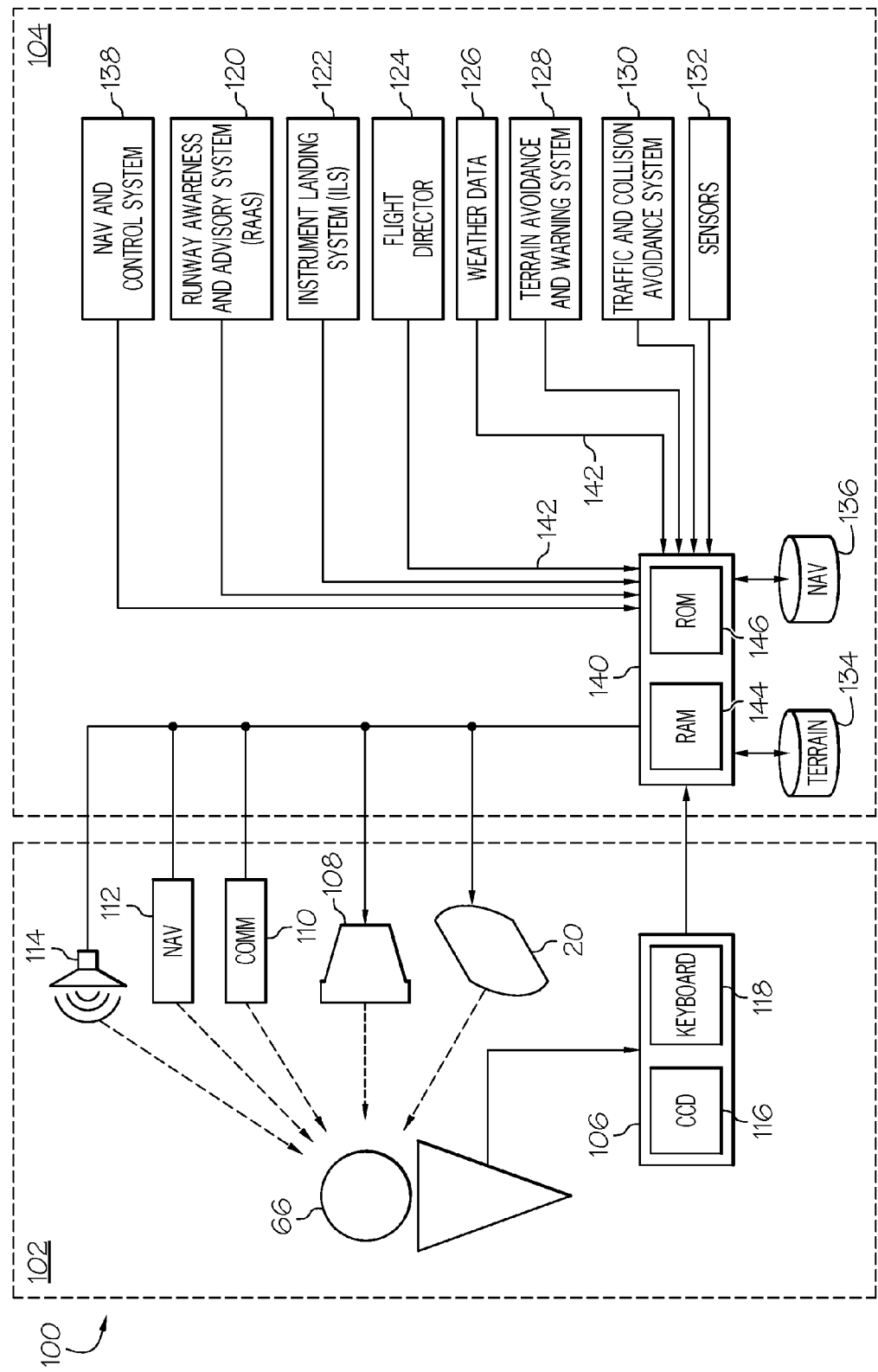
FIG. 9 is a block diagram schematically illustrating a vehicle including a flight deck and an avionics/flight system in which the HUD system of FIG. 1 may be implemented.

FIG. 9 schematically illustrates a vehicle 100, such as an aircraft, in which the HUD system 20 described above may be implemented, according to one embodiment of the present invention. The vehicle 100 may be, in one embodiment, any one of a number of different types of aircraft such as, for example, a private propeller or jet engine driven airplane, a commercial jet liner, or a helicopter. In the depicted embodiment, the vehicle 100 includes a flight deck 102 (or cockpit) and an avionics/flight system 104. Although not specifically illustrated, it should be understood that the vehicle 100 also includes a frame or body to which the flight deck 102 and the avionics/flight system 104 are connected, as is commonly understood. It should also be noted that vehicle 100 is merely exemplary and could be implemented without one or more of the depicted components, systems, and data sources. It will additionally be appreciated that the vehicle 100 could be implemented with one or more additional components, systems, or data sources.

The flight deck 102 includes the HUD system 20, a user interface 106, at least one display device 108 (e.g., a primary flight display (PFD)), a communications radio 110, a navigational radio 112, and an audio device 114. The user interface 106 is configured to receive input from the user 66 (e.g., the pilot) and, in response to the user input, supply command signals to the avionics/flight system 104. The user interface 106 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 106 includes a CCD 116 and a keyboard 118. The users 66 uses the CCD 116 to, among other things, move a cursor symbol on the display device 108, and may use the keyboard 118 to, among other things, input textual data.

Still referring to FIG. 1, the HUD system 20 (as described above) and the display device 108 are used to display various images and data, in graphic, iconic, and/or textual formats, and to supply visual feedback to the user 66 in response to user input commands supplied by the user 66 to the user interface 106. It will be appreciated that the display device 108 may be implemented using any one of numerous known displays suitable for rendering image and/or text data in a format viewable by the user 66, such as a cathode ray tube (CRT) display or a LCD.

The communication radio 110 is used, as is commonly understood, to communicate with entities outside the vehicle 100, such as air-traffic controllers and pilots of other aircraft. The navigational radio 112 is used to receive from outside sources and communicate to the user various types of information regarding the location of the vehicle, such as Global Positioning Satellite (GPS) system and Automatic Direction Finder (ADF) (as described below). The audio device 114 is, in one embodiment, an audio speaker mounted within the flight deck 102.

The avionics/flight system 104 includes a runway awareness and advisory system (RAAS) 120, an instrument landing system (ILS) 122, a flight director 124, a weather data source 126, a terrain avoidance warning system (TAWS) 128, a traffic and collision avoidance system (TCAS) 130, a plurality of sensors 132, one or more terrain databases 134, one or more navigation databases 136, a navigation and control system 138, and a processor 140. The various components of the avionics/flight system 104 are in operable communication via a data bus 142 (or avionics bus).

The RAAS 120 provides improved situational awareness to help lower the probability of runway incursions by providing timely aural advisories to the flight crew during taxi, takeoff, final approach, landing and rollout. The ILS 122 is a radio navigation system that provides aircraft with horizontal and vertical guidance just before and during landing and, at certain fixed points, indicates the distance to the reference point of landing. The flight director 124, as is generally known, supplies command data representative of commands for piloting the aircraft in response to flight crew entered data, or various inertial and avionics data received from external systems. The weather data source 126 provides data representative of at least the location and type of various weather cells. The TAWS 128 supplies data representative of the location of terrain that may be a threat to the aircraft, and the TCAS 130 supplies data representative of other aircraft in the vicinity, which may include, for example, speed, direction, altitude, and altitude trend. Although not illustrated, the sensors 132 may include, for example, a barometric pressure sensor, a thermometer, and a wind speed sensor.

The terrain databases 134 include various types of data representative of the terrain over which the aircraft may fly, and the navigation databases 136 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information.

Although not illustrated, the navigation and control system 138 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear). The processor 140 may be any one of numerous known general-purpose microprocessors or an application specific processor that operates in response to program instructions. In the depicted embodiment, the processor 140 includes on-board RAM (random access memory) 144 and on-board ROM (read only memory) 146. The program instructions that control the processor 140 may be stored in either or both the RAM 144 and the ROM 146. For example, the operating system software may be stored in the ROM 146, whereas various operating mode software routines and various operational parameters may be stored in the RAM 144. It will be appreciated that this is merely exemplary of one scheme for storing operating system software and software routines, and that various other storage schemes may be implemented. It will also be appreciated that the processor 140 may be implemented using various other circuits, not just a programmable processor. For example, digital logic circuits and analog signal processing circuits could also be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A head-up display (HUD) system comprising:
an imaging subsystem comprising a viewing screen having a surface, a liquid crystal display (LCD) and a lens positioned between the LCD and the viewing screen, the imaging system being characterized in that if light of a first uniformity were propagated through the LCD and lens to the viewing screen, an uncompensated image would be displayed to a user via uncompensated image light propagating from the imaging subsystem to the user, the image light having a first portion with a first value of a radiant property and a second portion with a second value of the radiant property, a difference between the first and second values being a first amount; and
a light source configured to emit source light of a second, predetermined uniformity through the imaging system such that when the source light is propagated through the imaging subsystem, a compensated image is displayed to the user via compensated image light, the first portion of the compensated image light having a third value of the radiant property, and the second portion of the image light having a fourth value of the radiant property, a difference between the third and fourth values being a second amount, the second amount being less than the first amount,
wherein the image light propagates from the viewing screen to the user such that the images are displayed to the user on the viewing screen and the first portion of the image light propagates from a first portion of the surface of the viewing screen at a first angle of incidence, and the second portion of the image light propagates from a second portion of the surface of the viewing screen at a second angle of incidence, and
the difference between the first uniformity and the second, predetermined uniformity includes differences an optical frequency uniformity and an emission angle uniformity.

2. The HUD system of claim 1, wherein the radiant property comprises at least one of luminance and optical frequency of the image light.

3. The HUD system of claim 2, wherein the light source comprises a plurality of light generating components.

4. The HUD system of claim 3, wherein a first portion of the light generating components is configured to emit light with a first value of a second radiant property, and a second portion of the light generating components is configured to emit light with a second value of the second radiant property; and
wherein the second radiant property is different from the first radiant property.

5. The HUD system of claim 4, wherein the second radiant property comprises at least one of luminance, frequency, and angle of propagation from the light source.

6. The HUD system of claim 5, wherein the light generating components comprise a plurality of light emitting diodes (LEDs), each LED configured to emit light of a predetermined color between a first and second frequency.

7. The HUD system of claim 6, wherein the viewing screen transmits a majority of frequencies of visible light of said predetermined color and reflects light between the first and second frequency.

8. A head up display (HUD) system comprising:
a liquid crystal display (LCD) panel configured to modulate light propagating therethrough;
at least one lens arranged to focus the light propagating from the LCD panel;
an image combiner comprising a viewing screen having a flat surface and being configured to simultaneously capture the light from the at least one lens and display a first image to a user and transmit light propagated from an object to display a second image to the user, the LCD display panel, the at least one lens, and the image combiner jointly forming an imaging subsystem characterized in that if light of a first uniformity were propagated therethrough, an uncompensated first image would be displayed to the user via uncompensated image light propagating from the image combiner to the user, the uncompensated image light having a first portion with a first value of a radiant property and a second portion with a second value of the radiant property, a difference between the first and second values being a first amount; and
a light source comprising a plurality of light generating components configured to emit source light of a second, predetermined uniformity through the imaging system such that when the source light is propagated through the imaging subsystem, a compensated first image is displayed to the user via compensated image light, a first portion of the compensated image light having a third value of the radiant property and a second portion of the image light having a fourth value of the radiant property, a difference between the third and fourth values being a second amount, the second amount being less than the first amount, the first portion of the compensated image light corresponding to the first portion of the uncompensated image light and the second portion of the compensated image light corresponding to the second portion of the uncompensated image light,
wherein the image light propagates from the viewing screen to the user such that the images are displayed to the user on the viewing screen, the first portion of the image light propagates from a first portion of the flat surface of the viewing screen at a first angle of incidence, and the second portion of the image light propagates from a second portion of the flat surface of the viewing screen at a second angle of incidence,
the difference between the first uniformity and the second, predetermined uniformity includes differences in an optical frequency uniformity and an emission angle uniformity, and
the lens is positioned between the LCD and the viewing screen.

9. The HUD system of claim 8, wherein the radiant property comprises at least one of luminance and optical frequency of the image light, a first portion of the light generating components is configured to emit light with a first value of a second radiant property, a second portion of the light generating components is configured to emit light with a second value of the second radiant property, and the second radiant property comprises at least one of luminance, frequency, and angle of propagation from the light source, and wherein the second radiant property is different than the first radiant property.

10. The HUD system of claim 9, wherein the light source further comprises at least one reflective body to reflect the light from at least a portion of the plurality of light generating components towards the imaging subsystem.

11. The HUD system of claim 9, wherein the light source further comprises a plurality of propagation angle mechanisms, each being coupled to a respective one of the plurality of light generating components to alter the angle of propagation of the light therefrom.

12. A method for optimizing image uniformity in a head up display (HUD) comprising:
   providing a HUD imaging subsystem comprising a viewing screen, a liquid crystal display (LCD) and a lens positioned between the viewing screen and the LCD;
   determining a difference between a first value of a radiant property of a first portion of image light propagated to a user from the viewing screen and a second value of the radiant property of a second portion of the image light propagated to the user from the viewing screen, said image light being propagated to the user when light of a first uniformity is propagated into the imaging subsystem; and
   providing a light source configured to emit source light of a second, predetermined uniformity through the imaging system such that the first portion of the image light has a third value of the radiant property and the second portion of the image light has a fourth value of the radiant property, a difference between the third and fourth values of the radiant property being less than the difference between the first and second values of the radiant property,
   wherein the first portion of the image light propagates from a first portion of the surface of the viewing screen at a first angle of incidence, and the second portion of the image light propagates from a second portion of the surface of the viewing screen at a second angle of incidence and the radiant property comprises at least one of luminance and optical frequency of the image light, and
   the difference between the first uniformity and the second, predetermined uniformity includes differences in an optical frequency uniformity and an emission angle uniformity.

13. The method of claim 12, wherein a first portion of the source light has a first value of a second radiant property and a second portion of the source light has a second value of the second radiant property, the first portion of the source light being associated with the first portion of the image light and the second portion of the source light being associated with the second portion of the image light, and wherein the second radiant property is different than the first radiant property.

14. The method of claim 13, wherein the source light is emitted from a light source comprising a plurality of light generating components and the second radiant property comprises at least one of luminance, optical frequency, and angle of propagation from the light source.

* * * * *